(12) United States Patent
Kudo et al.

(10) Patent No.: US 7,663,110 B2
(45) Date of Patent: Feb. 16, 2010

(54) SCINTILLATOR PANEL AND FLAT-PANEL RADIATION DETECTOR

(75) Inventors: Shinji Kudo, Tokyo (JP); Yasushi Nagata, Tokyo (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 12/034,123

(22) Filed: Feb. 20, 2008

(65) Prior Publication Data
US 2008/0203312 A1 Aug. 28, 2008

(30) Foreign Application Priority Data
Feb. 26, 2007 (JP) ............... 2007-045355

(51) Int. Cl.
*G01T 1/20* (2006.01)
(52) U.S. Cl. .............................. 250/361 R; 250/370.11
(58) Field of Classification Search ............ 250/370.11, 250/361 R
See application file for complete search history.

(56) References Cited

U.S. PATENT DOCUMENTS

2002/0066868 A1* 6/2002 Shoji et al. ............... 250/484.4
2004/0000644 A1* 1/2004 Homme .................. 250/361 R
2005/0088566 A1* 4/2005 Tamura et al. ............. 348/362
2005/0156113 A1* 7/2005 Suzuki et al. .............. 250/368
2005/0211917 A1* 9/2005 Fukui et al. .............. 250/484.4

FOREIGN PATENT DOCUMENTS

| JP | 5-312961 | 11/1993 |
|---|---|---|
| JP | 6-331749 | 12/1994 |
| JP | 2000-356679 | 12/2000 |
| JP | 2002-116258 | 4/2002 |
| WO | 92-06476 | 4/1992 |
| WO | 99-66345 | 12/1999 |

\* cited by examiner

*Primary Examiner*—David P Porta
*Assistant Examiner*—Jessica L Eley
(74) *Attorney, Agent, or Firm*—Cantor Colburn LLP

(57) ABSTRACT

A scintillator panel comprising a scintillator plate containing a substrate having thereon a reflective layer, a sublayer and a scintillator layer in that order, wherein the scintillator plate is sealed with: a first protective film provided on a side of the scintillator layer; and a second protective film provided on a side of the substrate opposite the scintillator layer, wherein the first protective layer is not adhered to the scintillator layer, and the second protective layer contains an aluminum layer.

3 Claims, 3 Drawing Sheets

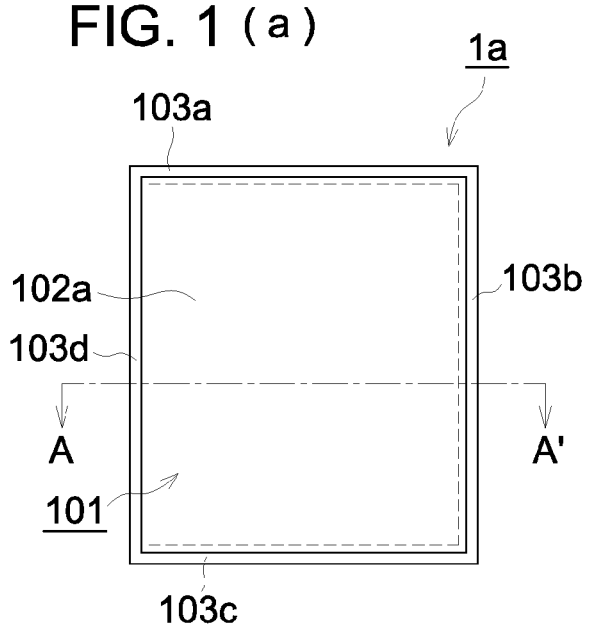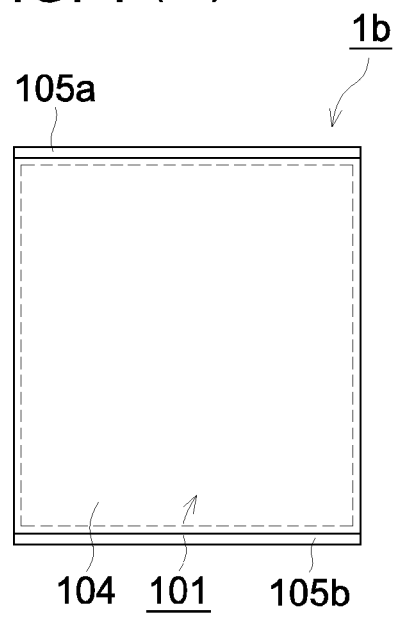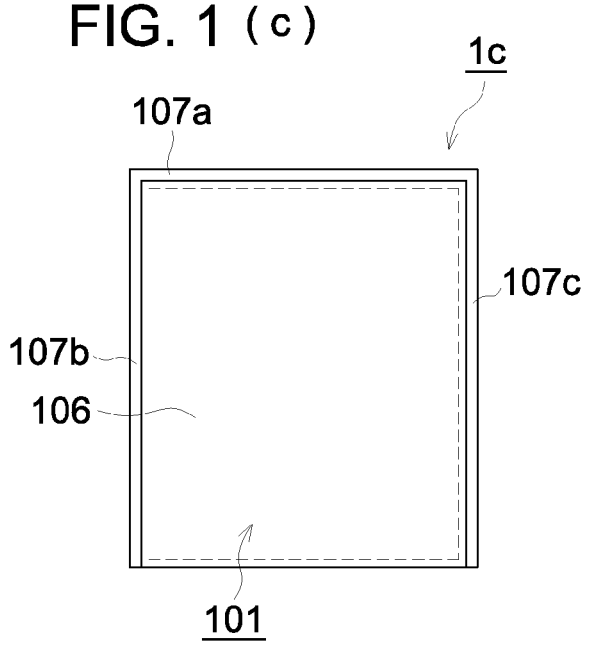

SCINTILLATOR PANEL AND FLAT-PANEL RADIATION DETECTOR

This application is based on Japanese Patent Application No. 2007-045355 filed on Feb. 26, 2007 with Japan Patent Office, the entire content of which is hereby incorporated by reference.

TECHNICAL FIELD

The present invention relates to a scintillator panel which is employed during formation of radiation images of a subject and a flat-panel radiation detector employing the same.

BACKGROUND

Heretofore, radiation images such as X-ray images have widely been employed in hospitals and clinics for the state of a disease. Specifically, over a long period of history, radiation images formed via intensifying screen-film systems have resulted in high photographic speed and high image quality, whereby even now, they are employed in hospitals and clinics in the world as imaging systems which simultaneously exhibit high reliability and cost performance. However, types of the above image information are those of so-called analogue image information, and enable to achieve neither free image processing nor instantaneous electric transmission, which are realized in digital image information which have been developed in recent years.

Further, in recent years, digital system radiation image detectors, represented by computed radiography (CR) and flat-panel type radiation detectors (FPD) have appeared. These enable direct formation of digital radiation images and direct display images on image display devices such as a cathode tube or a liquid crystal panel can be achieved. When applying these radiographies, images are not always required to be formed on photographic film. As a result, the above digital system X-ray image detectors have decreased the need of image formation via silver halide photographic systems and have significantly enhanced convenience of diagnostic operation in hospitals and clinics.

As one of the digital technologies of X-ray images, computed radiography (CR) is presently employed in medical settings. However, sharpness is insufficient and spatial resolution is also insufficient, whereby its image quality level has not reached that of the screen-film systems. Further developed as a new digital X-ray image technology are flat-panel X-ray detectors (FPD) employing thin-film transistors (TFT), which are described, for example, on page 24 of John Rawland's report, "Amorphous Semiconductor Usher in Digital X-ray Imaging", Physics Today, November 1997 and on page 2 of L. E. Antonku's report, "Development of a High Resolution, Active Matrix, Flat-panel Imager with Enhanced Fill Factor" of the magazine of SPIE, Volume 32, 1997.

In order to convert radiation to visible light, employed are scintillator panels which are prepared employing X-ray phosphors exhibiting characteristics of emitting light via radiation. However, in order to enhance the SN ratio during imaging at low dosages, it becomes necessary to employ scintillator panel at a high light emitting efficiency. Generally, the light emitting efficiency of scintillator panels is determined by the thickness of the scintillator layer (also called a "phosphor layer") and the X-ray absorption coefficient, while as the thickness of the scintillator layer increases, scattering within the scintillator layer of emitted light occurs, which lowers sharpness. Consequently, when required sharpness for image quality is determined, the layer thickness is determined.

Of the above phosphors, cesium iodide (CsI) exhibits a relatively high conversion ratio from X-rays to visible light and it is possible that phosphors are easily formed in a columnar crystal structure via vapor deposition. Consequently, scattering of emitted light in crystals is retarded via optical guide effects, whereby it has been possible to increase the thickness of the scintillator layer.

However, when only CsI is employed, the light emission efficiency is relatively low. Therefore, as described for example, in Japanese Patent Publication No. 54-35060, a mixture of CsI and sodium iodide (NaI) at any appropriate mol ratio is deposited on a substrate in the form of sodium-activated cesium iodide (CsI: Na), employing vapor deposition, and recently a mixture of CsI and thallium iodide (TlI) at any appropriate mol ratio is deposited on a substrate in the form of thallium-activated cesium iodide, employing vapor deposition. The resulting deposition is subjected to annealing (a thermal treatment) as a post-process to enhance the visible light conversion efficiency, whereby resulting materials are employed as an X-ray phosphor.

Further proposed as another means to increase light output are a method in which a substrate which forms a scintillator is made to be reflective (refer, for example, to Patent Document 1), a method in which a reflective layer is arranged on the substrate, and a method in which a reflective thin-metal film arranged on the substrate and a scintillator on the transparent organic film covering the metal thin-film are formed (refer, for example, to Patent Document 2). These methods increase the resulting light amount, while problems occur in which the sharpness is significantly degraded.

Still further, methods to arrange a scintillator panel on the surface of a flat light receiving element are described, for example in JP-A Nos. 5-312961 and 6-331749. However, these methods result in poor production efficiency, and degradation of sharpness on the scintillator panel and the flat light receiving element surface is unavoidable.

Heretofore, it has been common that as a production method of scintillators via a gas layer method, a scintillator layer is formed on a stiff substrate and the entire surface of the scintillator is covered with a protective film (refer, for example, to Patent Document 3). However, when the scintillator layer is formed on such a substrate, which is not easily bent, drawbacks result in which, during adhesion of the scintillator panel onto the surface of the flat light receiving element, uniform image quality characteristics are not realized in the light receiving plane of flat-panel detectors due to effects such as deformation of the substrate or curling during vapor deposition. Further, when the substrate is composed of metal, X-ray absorption increases, whereby in terms of realization of lower X-ray exposure, problems have occurred. On the other hand, amorphous carbons, which have recently been employed, are useful in terms of less X-ray absorption. However, since universal products of a large size are unavailable and the price is very high, it is difficult to state that they are suitable for practical production. Accordingly, in recent years such problems have risen along with the increase in size of flat-panel detectors.

In order to avoid such problems, commonly employed are a method in which a scintillator is formed directly onto the surface of a flat light receiving element (on the imaging element) via vapor deposition, and a method in which a scintillator panel such as a flexible medical intensifying screen is employed as a substitute. Further, an example is disclosed in which a flexible protective layer such as poly(para-xylylene) is employed (refer, for example, to Patent Document 4).

Scintillator materials directly vapor-deposited onto the flat light receiving element exhibit highly desirable image characteristics. However, a drawback in terms of cost occurs in such a manner that when vapor-deposited products are unacceptable, expensive light receiving elements are wasted. Another drawback is that even though image desirable characteristics of scintillator materials are enhanced via a thermal process, the processing temperature is limited due to the fact that light receiving elements are weak for heat. Further, a problem occurs in which complexities result in such a manner that it is necessary to incorporate cooling of light receiving elements in the above thermal process.

Accordingly, in order to overcome problems as described above, it has been increasingly demanded to develop a radiation flat-panel detector which exhibits excellent production adaptability, minimizes deterioration of characteristics during aging, protects the scintillator (namely the phosphor) layer from chemical modification or physical impact, results in minimal degradation of sharpness between the scintillator panel and the surface of the flat light receiving element, and results in desired characteristics of uniform image quality.

(Patent Document 1) Japanese Patent Publication No. 7-21560 (WO 92/06476)

(Patent Documents 2) Japanese Patent Publication Open to Public Inspection (hereinafter referred to as JP-A) No. 2000-356679

(Patent Document 3) Japanese Patent No. 3566926 (WO 99/066345)

(Patent Document 4) JP-A No. 2002-116258

In view of the foregoing, the present invention was achieved. An object of the present invention is to provide a scintillator panel which exhibits excellent suitability for production, high efficiency to draw light emitted by a scintillator, high sharpness, and minimal degradation of sharpness between the surfaces of flat light receiving elements, and a flat-panel radiation detector using the same.

An object of the present invention can be achieved by the following embodiments.

1. A scintillator panel comprising a scintillator plate comprising a substrate having thereon a reflective layer, a sublayer and a scintillator layer in that order,
   wherein the scintillator plate is sealed with:
   a first protective film provided on a side of the scintillator layer; and
   a second protective film provided on a side of the substrate opposite the scintillator layer,
   wherein the first protective layer is not adhered to the scintillator layer, and the second protective layer contains an aluminum layer.

2. The scintillator panel of the above-described item 1,
   wherein the scintillator layer is a columnar phosphor layer comprising cesium iodide, and the scintillator layer is produced by a gas phase deposition method.

3. The scintillator panel of the above-described items 1 or 2,
   wherein the substrate is made of a heat resisting resin.

4. A flat-panel radiation detector comprising:
   the scintillator panel of any one of the above-described items 1-3; and
   a flat light receiving element,
   wherein the scintillator plate is arranged facing the flat light receiving element without physicochemical adhesion to a surface of the flat light receiving element.

By the above means of the present invention, it is possible to provide a scintillator panel which exhibits excellent production suitability, high efficiency to draw light emitted by a scintillator, high sharpness, and minimal degradation of the sharpness between the surfaces of flat light receiving elements, and a flat-panel radiation detector using the same.

BRIEF DESCRIPTION OF THE DRAWINGS

FIGS. 1(a) to 1(c) are schematic plan views of a scintillator panel.

DESCRIPTION OF THE PRESENT EMBODIMENT

Figure 2:
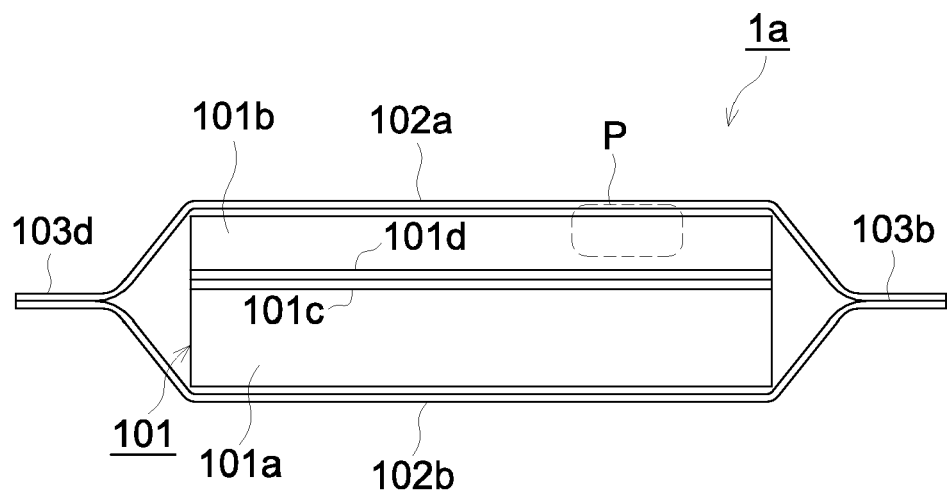
FIGS. 2(a) and 2(b) are schematic sectional views along A-A' of FIG. 1(a).
FIG. 2(c) is a schematic sectional view showing a contact state with a flat light receiving element.
Figure 2:
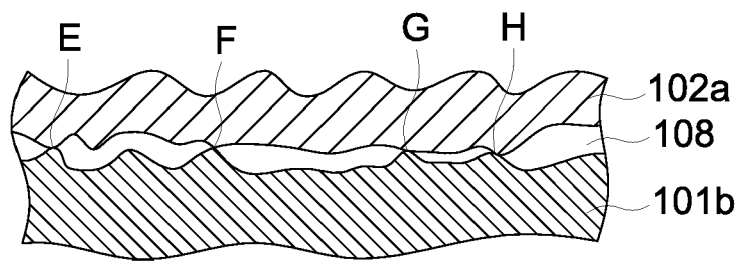
Figure 2:
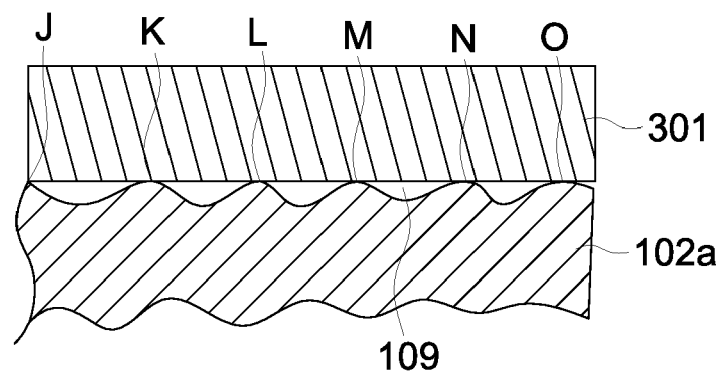
Figure 3:
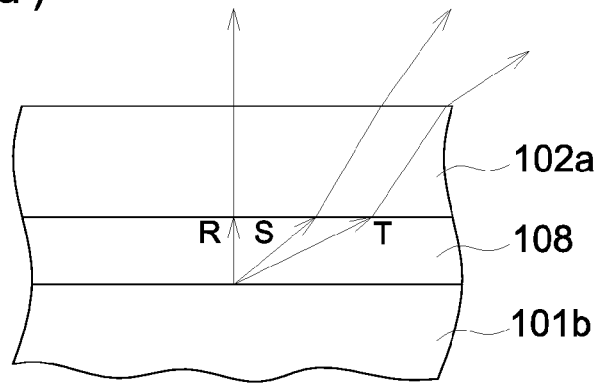
FIG. 3(a) is a schematic view showing the light refraction state in a void shown in FIG. 2(b).
FIG. 3(b) is a schematic view showing the light refraction in such a state that a conventional protective film is brought into close contact with a scintillator layer (being a phosphor layer).
Figure 3:
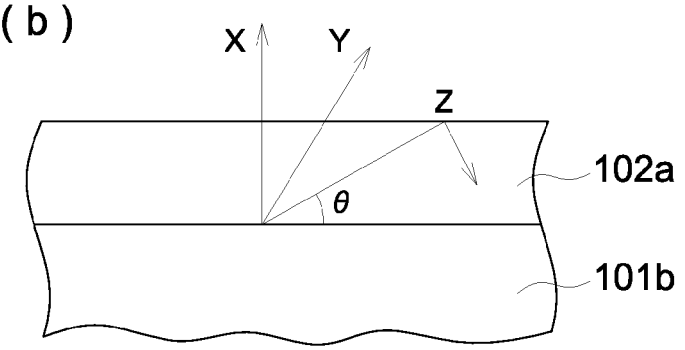

Preferred embodiments to practice the present invention will now be described, however the present invention is not limited thereto.

In a scintillator panel employing a scintillator plate which incorporates a substrate having thereon a reflective layer, a sublayer, and a scintillator layer in the stated order, the scintillator panel of the present invention is characterized in that the aforesaid scintillator plate is sealed by a first protective film arranged on the above scintillator layer side, and a second protective film arranged on the exterior of the above substrate, the aforesaid second protective film has an aluminum layer, and the aforesaid first protective film is not adhered to the aforesaid scintillator layer, and the aforesaid scintillator plate is employed as a constituting component of the flat-panel radiation detector without physicochemical adhesion to the surface of the flat light receiving element. The latter is a technical characteristic, which is common to the above-described claims 1-4.

"Aluminum layer", as described herein, refers to an aluminum-deposited film or aluminum foil. Further, "scintillator layer", as described herein, refers to a phosphor layer incorporating phosphor materials. Still further, "without physicochemical adhesion" means that no form of adhesion is carried out via physical interaction or chemical reactions employing adhesives.

The present invention and constituting elements thereof will now be detailed.

(Constitution of Scintillator Plates and Panel)

The scintillator plate according to the present invention incorporates a substrate having thereon a reflective layer, a sublayer and a scintillator layer in the stated order. Further, the scintillator panel of the present invention incorporates a scintillator plate having thereon at least a protective layer. Further, in the present invention, a feature is that the protective film described below is employed as a protective layer.

(Scintillator Layer)

Various phosphor materials known in the art are usable as materials to form the scintillator layer (also referred to as "the phosphor layer"). Of these, cesium iodide (CsI) is preferred due to the following. Since cesium iodide easily enables formation of a columnar crystal structure of phosphors, which minimizes scattering of emitted light in the crystal, whereby it is possible to increase the thickness of the scintillator layer.

However, since CsI alone results in lower light emission efficiency, various activators are incorporated. One example is listed in which CsI and sodium iodide (NaI) are mixed at any appropriate mol ratio, as described in Japanese Patent Publication No. 54-35060. Further, as disclosed, for example, in JP-A No. 2001-59899, vapor-deposited CsI is preferred which incorporates activators such as thallium (Tl), europium (Eu), indium (In), lithium (Li), potassium (K), rubidium (Rb), or sodium (Na). In the present invention, particularly preferred are thallium (Tl) and europium (Eu), but thallium (Tl) is more preferred.

In addition, in the present invention, it is preferable to employ, as raw materials, additives incorporating at least one type of thallium compounds and cesium iodide. Namely, thallium-activated cesium iodide (Cs: Tl) is preferred since it has a broad light emission wavelength of 400-750 nm.

Usable thallium compounds, as additives, which incorporate at least one thallium compound, according to the present invention, include various ones (namely compounds having an oxidation number of +I and +III).

In the present invention, preferred thallium compounds include thallium bromide (TlBr), thallium chloride (TlCl), and thallium fluorides (TlF and $TlF_3$).

Further, the melting point of the thallium compounds according to the present invention is preferably in the range of 400-700° C. When the melting point exceeds 700° C., additives in the columnar crystals are not uniformly oriented, resulting in a decrease in light emission efficiency. Meanwhile, the melting point in the present invention refers to one at normal temperature and pressure.

Further, the molecular weight of thallium compounds is preferably in the range of 206-300.

In the scintillator layer of the present invention, it is desirable that the content of the aforesaid additives is optimally regulated depending on the targeted performance. The above content is preferably 0.001-50 mol % with respect to the content of cesium iodide, but is more preferably 0.1-10.0 mol %.

When the added amount is less than 0.001 mol % with respect to cesium iodide, the resulting luminance of emitted light results in no significant difference from that obtained by employing cesium alone, whereby it is not possible to realize the targeted luminance of emitted light. On the other hand, when it exceeds 50 mol %, it is not possible to maintain properties and functions of cesium iodide.

In addition, in the present invention, after preparing the scintillator layer via vapor deposition of raw materials of the scintillator onto a polymer film, it is required to conduct a thermal treatment over at least one hour under an ambience of the temperature range of −50 to +20° C., employing the glass transition temperature of the aforesaid polymer film as a standard. By doing so, it is possible to realize a scintillator panel of high light emission efficiency without generation of film deformation and phosphor peeling.

(Reflective Layer)

The reflective layer according to the present invention is employed to enhance light drawing efficiency by reflecting the light emitted from the scintillator. It is preferable that the aforesaid reflective layer is formed employing materials incorporating any of the elements selected from the element group consisting of Al, Ag, Cr, Cu, Ni, Ti, Mg, Rh, Pt, and Au. Specifically, it is preferable to employ a thin metal film composed of the above metals, such as a Ag film, or an Al film. Further, at least two layers of the above may be formed.

(Sublayer)

In view of protecting the reflective layer, a sublayer according to the present invention is required to be arranged between the reflective layer and the scintillator layer.

Further, it is preferable that the aforesaid sublayer incorporates polymer binders and dispersing agents.

In addition, the thickness of the sublayer is preferably 0.5-2 μm. When the thickness is at most 3 μm, light scattering in the sublayer is minimized to result in desired sharpness. Further, when the thickness of the sublayer is at most 2 μm, the columnar crystal structure is not modified.

The components of the sublayer will now be described.

<Polymer Binders>

It is preferable that the sublayer according to the present invention is formed by coating polymer binders (hereinafter also referred to as "binders") which are dissolved or dispersed in solvents, followed by drying. It is preferable to specifically employ, as polymer binders, polyimide or polyimide containing resins, polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (such as nitrocellulose), styrene-butadiene copolymers, various synthetic rubber based resins, phenol resins, epoxy resins, urea resins, melamine resins, phenoxy resins, silicone resins, acryl based resins, and urea formamide resins. Of these, it is preferable to employ polyurethane, polyester, vinyl chloride based copolymers, polyvinyl butyral, and nitrocellulose.

In view of close contact with the scintillator layer, specifically preferred as the polymer binders according to the present invention are polyimide or polyimide containing resins, polyurethane, polyester, vinyl chloride copolymers, polyvinyl butyral, and nitrocellulose. Further, in view of the adhesion between the vapor deposition crystals and the substrate, preferred are polymers which exhibit a glass transition temperature (Tg) of 30-100° C. In the above point of view, specifically preferred as the polymer binders are polyester resins. However, when the thermal processing temperature is raised to enhance image characteristics such as luminance, heat resistance of polymers of a Tg of 30-100° C. is occasionally not secured. In such a case, employed are polyimide or polyimide containing resins.

Solvents which are usable to prepare the sublayer include N,N-dimethylacetamide, N-methyl-2-pyrrolidone, lower alcohol such as methanol, ethanol, n-propanol, or n-butanol, chlorine atom containing hydrocarbons such as methylene chloride or ethylene chloride, ketones such as acetone, methyl ethyl ketone, or methyl isobutyl ketone, aromatic compounds such as toluene, benzene, cyclohexane, cyclohexanone, or xylene, esters of lower fatty acids with lower alcohols such as methyl acetate, ethyl acetate, or butyl acetate, and ethers such as dioxane, ethylene glycol, monoethyl ester, or ethylene glycol monomethyl ester, as well as mixtures thereof.

In order to minimize scattered light emitted by scintillators and to enhance sharpness, pigments and dyes may be incorporated into the sublayer according to the present invention.

(Protective Layer)

The protective layer according to the present invention is mainly aimed to protect the scintillator layer. Namely, cesium iodide (CsI) easily absorbs moisture. When it is exposed to an ambient atmosphere, it is subjected to deliquescence via absorption of moisture from the atmosphere. Consequently, the protective layer is provided to minimize the above deliquescence. It is possible to form the aforesaid protective layer employing various materials.

In the scintillator panel according to the present invention, it is possible to provide a protective film on the scintillator layer of the scintillator plate.

Further, the aforesaid scintillator panel is sealed via the first protective film arranged on the scintillator side and the second protective film arranged on the outer side of the substrate. In such arrangement, it is preferable to realize an embodiment in which the aforesaid first protective layer is not physicochemically adhered to the aforesaid scintillator layer.

"Is not physicochemically adhered", as described herein, means that as mentioned above, no adhesion is conducted via physical interaction or chemical reaction employing adhesives. The above non-adhesion state may mean that even though the surface of the scintillator layer and the protective film are microscopically subjected to point-to-point contact, the surface of the scintillator layer and the protective film may optically and dynamically be almost in a state which is treated as a discontinuous body.

The protective film employed in the present invention will now be detailed.

(Protective Film)

An example of the constitution of the protective film employed in the present invention includes a multilayer material composed of a protective layer (being an outermost layer)/an interlayer (being a moisture-proof layer)/an innermost layer (being a thermally adhesive layer). If desired, each layer may be composed of a multilayer.

(Innermost Layer (Thermally Adhesive Layer))

It is preferable to employ, as a thermoplastic film of the innermost layer, a film of EVA, PP, LDPE, and LLDP, LDPE, or LLDPE which is produced employing metallocene as a catalyst, as well as a film in which these films and an HDPE film are employed while blended.

(Interlayer (Being a Moisture-Proof Layer))

The interlayer (the moisture-proof layer) includes a layer incorporating at least one inorganic film which is described in JP-A No. 6-95302, and also on pages 132-134 of Shinku Handbook (Vacuum Handbook), Revised Edition (ULVAC, Inc.). the inorganic film includes a metal deposited film and an inorganic oxide deposited film.

Examples of the metal deposited film include ZrN, SiC, TiC, $Si_3N_4$, single crystal Si, ZrN, PSG, amorphous Si, W, and aluminum. The specifically preferred metal deposited film employs aluminum.

Inorganic compound vapor deposited films include those described on pages 879-901 of Hakumaku Handbook (Thin film Handbook) (Japan Society for Promotion of Science), on pages 502-509, 612, and 810 of Shinku Gijutu Handbook (Vacuum Technology Handbook) (Nikkan Kogyo Shimbun, Ltd.), and on pages 132-134 of Shinku Handbook (Vacuum Handbook), Revised Edition (ULVAC, Inc.). For example, employed as such inorganic compound vapor deposited films are $Cr_2O_3$, $Si_xO_y$ (x=1 and y=1.5-2.0), $Ta_2O_3$, ZrN, SiC, TiC, PSG, $Si_3N_4$, single crystal Si, amorphous Si, W, and $Al_2O_3$.

It is possible to employ, as a thermoplastic resin film which is employed as a base material of the interlayer (being the moisture-proof layer), film materials which are employed for a common packaging film, such as ethylene tetrafluoroethyl copolymers (ETFE), high density polyethylene (HDPE), oriented polypropylene (OPP), polystyrene (PS), polymethyl methacrylate (PMMA), biaxially oriented nylon 6, polyethylene terephthalate, polycarbonate (PC), polyimide, or polyether styrene (PES).

In regard to methods to prepare a vapor deposition film, it is possible to employ common methods described, in Shinku Gijutsu Handbook (Vacuum Technology Handbook) and Hoso Gijutsu Volume 129, No. 8, such as a resistance or high frequency induction heating method, an electron beam (EB) method, or plasma (PCVD). The thickness of the vapor deposition film is preferably in the range of 40-200 nm, but is more preferably in the range of 50-180 nm.

Specifically in the present invention, a feature is that the second protective film according to the present invention incorporates an aluminum layer. It is possible to employ, as such aluminum layer, an aluminum deposited layer or aluminum foil.

In the second protective film according to the present invention, it is essential that the aluminum layer incorporates an interlayer (being a moisture-proof layer). The presence of the interlayer makes it possible to reduce cost and decrease moisture permeability (namely high moisture barring properties).

(Outermost Layer)

It is possible to employ, as a thermoplastic resin film employed via a vapor-deposited film sheet, polymer films used as common packaging materials, such as low density polyethylene (LDPE), HDPE, linear low density polyethylene (LLDPE), medium density polyethylene, cast polypropylene (CPP), OPP, oriented nylon (ONy), PET, cellophane, polyvinyl alcohol (PVA), oriented vinylon (OV), ethylene-vinyl acetate copolymers (EVOH), vinylidene chloride (PVDC), or polymers of fluorine-containing olefin (fluoroolefin) (all of which are polymer films described, for example, in New Development of Functioning Packaging Materials, Toray Research Center, Ltd.).

Obviously, if desired, it is possible to employ, as the above thermoplastic resin film, a multilayer film which is prepared via co-extrusion with other types of films, as well as a multilayer film prepared by lamination with a change of orientation angle. In order to realize further required physical properties of packaging materials, obviously, it is possible to prepare films in combinations of the density and molecular weight of the employed film.

As a thermoplastic resin film, employed are LDPE, LLDPE, and LDPE and LLDPE, both of which are prepared employing metallocene catalysts, and films in which the above films are mixed with an HDPE film.

When an inorganic compound-deposited layer is not employed, the protective layer is required to also function as an interlayer. In such a case, any of the thermoplastic resin films employed in the protective layer may be employed, if desired, in the form of a single layer of a laminated layer of at least two types of films. For example, employed are CPP/OPP, PET/OPP/LDPE, Ny/OPP/LDPE, CPP/OPP/EVOH, and SARAN UB/LLDPE (SARAN UB refers to a biaxially oriented film, produced by Asahi Kasei Corp., which employs, as raw materials, a vinylidene chloride/acrylic acid ester based copolymer resin), as well as K-OP/PP, K-PET/LLDPE, K-Ny/EVA (herein, K refers to a film coated with vinylidene chloride resins).

It is possible to produce these protective films employing various methods, which are commonly known, such as a wet lamination method, a dry lamination method, a hot melt lamination method, an extrusion lamination method, or a heat lamination method. Even when an inorganic compound-deposited film is not employed, it is obviously possible to employ the same methods. However, other than the above methods, it is possible to prepare the protective film employing a multilayer inflation system and a co-extrusion molding system, depending on the materials employed.

It is possible to employ, as an adhesive used during lamination, commonly known adhesives. Examples thereof include polyolefin based thermoplastic resin hot-melt adhesives such as various polypropylene resins; thermoplastic resin hot-melt adhesives such as ethylene-propylene copolymer resins, ethylene-vinyl acetate copolymer resins, ethylene-ethyl acrylate copolymer resins or ionomer resins, and others such as hot-melt type rubber based adhesives. Representative examples of emulsion type adhesives, which are in the form of an emulsion or latex, emulsions composed of polyvinyl acetate resins, vinyl acetate-ethylene copolymer resins, vinyl acetate and acrylic acid ester copolymer resins, vinyl acetate and maleic acid ester copolymer resins, acrylic acid copolymers, or ethylene-acrylic acid copolymers. Representative examples of latex type adhesives include rubber latexes composed of natural rubber, styrene butadiene rubber (SBR), acrylonitrile butadiene rubber (NBR), or chloroprene rubber (CR). Further cited as dry laminating adhesives are isocyanate based adhesives, urethane based adhesives, and polyester based adhesives. Other than these, it is possible to employ adhesives known in the art, such as hot-melt laminating adhesives prepared by blending paraffin wax, microcrystalline wax, ethylene-vinyl acetate copolymer resins, and ethylene-ethyl acrylate copolymer resins, pressure sensitive adhesives, and heat sensitive adhesives. Specific examples of polyolefin based resin adhesives for extrusion lamination include polymers composed of various polyolefin resins such as polyethylene resins, polypropylene resins or polypropylene resins, ethylene polymer (EVA and EEA) resins, as well as those such as L-LDPE resins which are prepared by copolymerizing ethylene and other monomers ($\alpha$-olefin), ionomer resins (ion copolymer resins) such as SURLYN of Du Pont Co. and HIMILAN of Mitsui Oil Co., Ltd. and ADMER (being an adhesive polymer) of Mitsui Petrochemicals Co., Ltd. In addition, recently, ultraviolet curable type adhesives have been employed. Specifically, LDPE resins and L-LDPE resins are preferred due to lower cost and excellent suitability for lamination. Further, particularly preferred are resin mixtures which are prepared by mixing at least above two of the above resins so that any drawbacks of any resin are balanced out. For example, when L-LDPE resins and LDPE resins are blended, spreading properties are enhanced to decrease neck-in, whereby the laminating rate is enhanced to reduce pinholes.

In consideration of void formation, protection of the scintillator layer (the phosphor layer), sharpness, moisture resistance, and workability, the thickness of the above protective film is preferably 12-200 μm, but is more preferably 50-150 μm. Further, in consideration of sharpness, irregularity of radiographic images, production stability, and workability, the haze ratio is preferably 3-40%, but is more preferably 3-10%. "Haze ratio" refers to the value determined by NDH 3000W of Nippon Denshoku Industries Co., Ltd. Films at a desired haze ratio are readily available on market via suitable selection.

In the present invention, upon considering a photoelectric conversion ratio and the wavelengths of radiation emitted by scintillators, the light transmission of the first protective film is preferably at least 70% at 550 nm. However, since it is industrially difficult to produce a film of a light transmission of at least 99%, in practice, the light transmission is preferably 99-70%. On the other hand, with regard to the second protective film, since it is not particularly required to exhibit light transmittance to give emitted light to radiation flat-panel detectors, its light transmission is not particularly limited.

In regard to protection of the scintillator layer and deliquescence, the moisture vapor transmittance of the first protective film is preferably at most 50 g/m$^2$·day (at 40° C. and 90% relative humidity) (determined based on JIS Z 0208), but is more preferably 10 g/m$^2$·day (at 40° C. and 90% relative humidity) (determined based on JIS Z 0208). However, since it is industrially difficult to produce a high light transmission film of at most 0.01 g/m$^2$·day (at 40° C. and 90% relative humidity), in practice, the moisture vapor transmittance is preferably 0.01-50 g/m$^2$·day (at 40° C. and 90% relative humidity) (determined based on JIS Z 0208), but is more preferably 0.1-10 g/m$^2$·day (at 40° C. and 90% relative humidity) (determined based on JIS Z 0208).

Since the first protective film requires high light transmittance and low moisture permeability, scientifically it becomes a high value-added material and industrially necessitates highly advanced production technologies, whereby it becomes a high priced film.

On the other hand, though the second protective film requires low moisture permeability (high water vapor barring properties), no light transmittance is required. Consequently, the second protective film is characterized in incorporating an aluminum layer. When an aluminum-deposited film or aluminum foil is employed as the aluminum layer to provide moisture barring properties, cost is reduced to satisfy demands. Further, the moisture permeability of the aluminum foil is assumed to practically be 0 g/m$^2$·day (at 40° C. and 90% relative humidity), whereby it is very appropriately employed while realizing high moisture barring properties and low cost. Still further, in the case of the second protective layer which requires no high light transmittance, it is unnecessary to reduce the thickness of the layer including a moisture barring layer and other layers, whereby as an effect other than those which have initially been expected, it is possible to increase the layer thickness while avoiding degradation of image quality. Consequently, advantages result in which it is possible to significantly reduce the risk of degradation of moisture barring properties due to destruction of the moisture-proof layer.

Accordingly, by optimally and differently constituting each of the first protective film and the second protective film, in view of the cost performance and moisture-proof, it is possible to enhance reliability.

(Substrates)

It is possible to employ, as the substrate according to the present invention, various metals, carbon, $\alpha$-carbon, and heat resistant resin substrates. In view of desired image characteristics and cost, heat resistant resin substrates are specifically preferred.

Any of the suitable resins known in the art are usable as the heat resistant resin, but it is preferable to employ so-called engineering plastics. "Engineering plastics", as described herein, refer to highly functional plastics employed for industrial uses, which commonly carry advantages of high strength and high heat resistance.

Engineering plastics according to the present invention are not particularly limited, and examples which are appropriately employed include polysulfone resins, polyether sulfone resins, polyimide resins, polyether imide resins, polyamide resins, polyacetal resins, polycarbonate resins, polyethylene terephthalate resins, polybutylene terephthalate resins, aromatic polyester resins, modified polyphenylene oxide resins, polyphenylene sulfide resins, and polyether ketone resins.

These engineering plastics may be employed individually or in combinations of at least two types.

Further, depending on curing temperature, it is also preferable to employ super-engineering plastics represented by polyether ketone (PEEK) and polytetrafluoroethylene (PTFE).

In the present invention, it is preferable to form substrates employing resins incorporating polyimides such as polyimide resins or polyether imide resins, which exhibit excellent heat resistance, workability, mechanical strength, and cost.

Occasionally, during arrangement of the scintillator panel facing the surface of a flat light receiving element, uniform image quality characteristics are not obtained due to effects such as the deformation of the substrate and curling during vapor deposition. In order to overcome the above drawbacks, a resin substrate of a thickness of 50-500 µm is employed as the aforesaid substrate so that the scintillator panel is deformed to the shape matching that of the surface of the flat light receiving element, whereby uniform sharpness is realized over the entire light receiving surface of the flat-panel detector.

(Preparation Method of Scintillator Plate and Panel)

The embodiments of the present invention will now be described with reference to FIG. 1(a) to FIG. 4, however the present invention is not limited thereto.

FIGS. 1(a) to 1(c) are schematic plan views of a scintillator panel. FIG. 1(a) is a schematic plan view of a scintillator panel in which a scintillator plate is sealed on four sides, employing a protective film. FIG. 1(b) is a schematic plan view of a scintillator panel in which a scintillator plate is sealed on two sides, employing a protective film. FIG. 1(c) is a schematic plan view of the scintillator panel in which a scintillator plate is sealed on three sides, employing a protective film.

The scintillator panel of FIG. 1(a) will now be described. In FIG. 1(a), 1a is a scintillator panel. Scintillator panel 1a incorporates scintillator plate 101, first protective film 102a arranged on the scintillator layer 101b side (refer to FIGS. 2(a) and 2(b)) of scintillator plate 101, and second protective film 102b (refer to FIG. 2(a)) arranged on the substrate 101a side of scintillator plate 101. Designations 103a-103d represent four sealing portions of protective film 102a and second protective film 102b (refer to FIG. 2(a)), and both sealing portions 103a-103d are formed on the outer periphery of scintillator plate 101. "Sealing on four sides", as described herein, refers to the embodiment having sealing portions on four sides, as shown in FIG. 1(a). The embodiment of sealing on four sides shown in FIG. 1(a) is prepared by sandwiching a scintillator plate between first protective film 102a and second protective film 102b (refer to FIG. 2(a)) and subsequently sealing the four sides. In this case, first protective film 102a and second protective film 102b (refer to FIG. 2(a)) may be the same or different and if desired, may be appropriately selected.

The scintillator panel in FIG. 1(b) will now be described. In the above figure, 1b represents a scintillator panel. Scintillator panel 1b incorporates scintillator plate 101, first protective film 104 arranged on the scintillator layer 101b side of scintillator plate 101, (refer to FIGS. 2(a) and 2(b)) and a second protective film (not shown) arranged on the substrate 101a side of scintillator plate 101. Each of 105a and 105b represents a sealing portion of protective film 104 and a second protective film (not shown) arranged on the substrate side, and sealing portions 105a and 105b are formed on the outer periphery of scintillator plate 101. "Sealed on two sides", as described herein, refers to the embodiment having a sealing portion on two sides, as shown in the above figure. The embodiment of sealing on two sides shown in the above figure is prepared by sandwiching a scintillator plate between protective films which are molded to a cylindrical shape via an inflation method and subsequently sealing the two sides. In this case, the same protective films are employed for first protective film 104 and the second protective film (not shown).

The scintillator panel in FIG. 1(c) will now be described. In the above figure, 1c represents a scintillator panel. Scintillator panel 1c incorporates scintillator plate 101, first protective film 106 arranged on the scintillator layer 101b side of scintillator plate 101 (refer to FIGS. 2(a) and 2(b)), and a second protective film (not shown) arranged on the substrate 101a side of scintillator plate 101. Designations 107a-107c represent three sealing portions of protective film 106 and a second protective film (not shown) arranged on the substrate side, and sealing portions 107a-107c are formed on the outer periphery of scintillator plate 101. "Sealing on three sides", as described herein, refers to the embodiment having sealing portion on three sides, as shown in the above figure. It is possible to realize the embodiment of sealing on three sides in such a manner that one protective film sheet is folded along the center and a scintillator plate is sandwiched between the folded protective film followed by sealing on the three sides. In this case, the same protective films are employed for first protective film 106 and the second protective film (not shown). As shown in FIGS. 1(a)-1(c), since the sealing portions of the first and second protective films are on the outer periphery of the scintillator plate, it becomes possible to inhibit penetration of moisture from the outer periphery. It is preferable that the scintillator layer of the scintillator plate shown in FIGS. 1(a)-1(c) is formed on the substrate employing the gas phase deposition method described below. It is possible to employ, as such gas phase deposition method, a vapor deposition method, a sputtering method, a CVD method, or an ion plating method.

The configuration of the scintillator panels shown in FIGS. 1(a)-1(c) is selectable depending on the types of the scintillator layer and the production apparatus of scintillator plates.

FIG. 2(a) is a schematic sectional view along A-A' in FIG. 1(a). FIG. 2(b) is a schematic enlarged view of portion "p" in FIG. 2 (a) FIG. 2 (c) is a schematic sectional view showing a contact state with a flat light receiving element.

Scintillator plate 101 incorporates substrate 101a and scintillator layer 101b formed on substrate 101a. Structure 101c is a reflective layer, and structure 101d is a sublayer. Designation 102b represents the second protective film arranged on the substrate 101b side of scintillator plate 101. Numeral 108 represents voids (air layers) formed between contacting points E-H which are formed by partial contact of first protective film 102a and scintillator layer 101b. Voids 108 are air layers, and the relationship of the refractive index of voids 108 with that of first protective film 102a is that refractive index of protective film 102a is much larger than refractive index of voids (air layer) 108.

Further, 109 represents voids (air layers) formed between contacting points J-O which are formed by partial contact of first protective film 102a and flat light receiving element 301. Voids 109 are air layers, and the relationship of the refractive index of void (air layer) 109 with that of first protective film 102a is that refractive index of protective film 102a is much larger than refractive index of void (air layer) 109.

Further, in the case of the scintillator panel shown in FIGS. 1(b) and 1(c), the relationship of the refractive index of voids (air layer) 108 or 109 with that of first protective film 102a is identical to the above figure.

Namely, first protective film 102a arranged on the scintillator layer 101b side is not in the state of entire close contact with scintillator layer 101b, but is in the state of only partial contact at contact points E-I. When the entire surface of scintillator layer 101b is covered by first protective film 102a arranged on the scintillator 101b side, it is preferable that the number of contacting points E-H is controlled to be 0.1-25/mm$^2$ with respect to the surface area of scintillator layer 101b. In the present invention, the above state is referred to as a state in which the first protective film arranged on the scintillator layer side is not substantially subjected to adhesion. Further, in the case of the scintillator panel shown in FIGS. 1(b) and 1(c), the relationship of the number of contacting points with respect to the surface area of the scintillator layer is identical to the above figure.

Further, first protective film 102a is not in the state of entire close contact with flat light receiving element 301, but is in the state of a partial contact at contacting point J-O. It is preferable that the number of contacting points J-O is controlled to be 0.1-25/mm$^2$ with respect to the surface area of flat light receiving element 301.

When the number of contacting points of first protective film 102a and scintillator layer 101b, and the number of contacting points of first protective film 102a and flat light receiving element 301 each exceed 25/mm$^2$, such a state becomes one of the causes to deteriorate sharpness. On the other hand, when the number of contacting points is less than 0.1/mm$^2$, such a state becomes one of the causes to deteriorate luminance and sharpness.

It is possible to determine the number of contacting points via the following method.

A scintillator panel is exposed to X-rays and the resulting light emission is read via a flat light receiving element employing CMOS or CCD, whereby signal value data are obtained. The resulting data are subjected to Fourier Transformation, and power spectrum data for each space frequency are obtained. It is possible to find the number of contacting points based on the peak position of the resulting power spectrum. Namely, a minute difference in luminance is generated in protective layer contacting points and non-contacting points. By determining the above cycle, it is possible to determine the number of contacting points.

However, the above method detects the total of the number of contacting points between first protective film 102a and scintillator layer 101b, and the number of contacting points between first protective film 102a and flat light receiving element 301. In order to separate each of the point contact values, a method is available, in which, for example, first protective film 102a is completely adhered to scintillator layer 101b via adhesives, and only the number of contacting points between first protective film 102a and flat light receiving element 301 is determined.

As shown in the present figure, scintillator panel 1a is in such a configuration that first protective film 102a is arranged on the scintillator layer 101b side of scintillator plate 101, and second protective film 102b is arranged on the substrate 101a side, and the entire surface of substrate 101a and scintillator layer 101b are covered with first protective film 102a in a substantially non-adhesion state, and each of the four edges of first protective film 102a and second protective film 102b is sealed.

The following method is listed in which the entire surface of scintillator layer 101b is covered with first protective film 102a in a state of no adhesion.

1) In considering close contact with the first protective film, sharpness, and close contact with the flat light receiving element, surface roughness Ra of the first protective film, which comes into contact with the scintillator layer, is regulated to be 0.05-0.8 µm. It is easy to regulate the surface shape of the first protective film via appropriate selection of the employed resin film and application of a coating incorporating inorganic compounds onto the surface of a resin film. Surface roughness Ra refers to the value determined by SURFCOM 1400D, produced by Tokyo Seimitsu Co., Ltd.

2) Sealing of a scintillator plate employing the first protective film and the second protective film is conducted at a pressure reduced state of 5-8,000 Pa. In this case, when sealing is conducted at high vacuum, the number of contacting points between a protective film and a scintillator layer, increases. On the contrary, when sealing is conducted at low vacuum, the number of contacting points decreases. Further, application of a pressure of at lest 8,000 Pa is not practical due to frequent formation of wrinkles on the surface of the protective layer.

By employing above methods 1) and 2) individually or in combination, it is possible to cover the entire surface of scintillator layer 101b with first protective film 102a in a state of substantially no adhesion.

The following method is listed which results in a state in which first protective film 102a and flat light receiving element 301 are substantially not in contact.

1) A method in which, after overlapping scintillator panel 1a on the flat light receiving element, appropriate pressure is applied onto the second protective film utilizing elasticity of a foam material, such as a sponge.

Based on above 1), it is possible to result in a state in which first protective film 102a is not substantially adhered to flat light receiving element 301.

In consideration of void formation, protection of the scintillator layer, sharpness, moisture-proofing, and workability, the thickness of the protective film is preferably 12-200 µm, but is more preferably 20-40 µm. In the above, "thickness" refers to the average of the thickness at 10 positions, determined by a stylus thickness meter (PG-01) produced by TECLOCK Co.

In consideration of sharpness, radiation image non-uniformity, production stability, and workability, the haze ratio is preferably 3-40%, but is more preferably 3-10%. "Haze ratio" refers to the value determined by NDH 5000W of Nippon Denshoku Industries Co., Ltd.

In consideration of photoelectric conversion efficiency and wavelengths of light emitted by scintillators, light transmittance of the protective film is preferably at least 70% at 550 nm. However, since it is difficult to commercially procure the film at a light transmittance of at least 99%, in practice the above light transmittance is preferably 99-70%. In the above, "light transmittance" refers to a value determined by a spectrophotometer (U-1800) produced by Hitachi High Technologies Co., Ltd.

In consideration of protection of the scintillator layer and deliquescence, the water-vapor permeability of the protective film is preferably at most 50 g/m$^2$·day (40° C. and 90% relative humidity) (determined in accordance with JIS Z 0208), but is more preferably at most 10 g/m$^2$·day (40° C. and 90% relative humidity) (determined in accordance with JIS Z 0208).

Any of the common conventional methods may be employed to seal scintillator plate 101 with first protective film 102a and second protective film 102b, as shown in the respective figure. For example, in order to achieve efficient sealing via heat adhesion employing an impulse sealer, it is preferable to employ a heat adhesive resin film as the innermost layer where protective film 102a and protective film 102b come into contact.

FIGS. 3(a) and 3(b) are schematic views showing a light refraction state in void 108 shown in FIG. 2(b), and light refraction in such a state that a conventional protective film is brought into close contact with a scintillator layer. FIG. 3(a) is a schematic view showing a light refraction state in void 108 shown in FIG. 2(b). FIG. 3(b) is a schematic view showing a light refraction state when a conventional protective film and a scintillator layer are in a close contact state.

The case of FIG. 3(a) will now be described.

In the case shown in this figure, since the state is such that void 108 (the air layer) is present between the protective film and the scintillator layer, the relationship of the refractive index of first protective film 102a with that of void 108 (the air layer) is the refractive index of the first protective film >> the refractive index of the void (the air layer). Consequently, light R-T emitted from the surface of the scintillator layer is not reflected on the interface between first protective film 102a and void (air layer) 108 (a state having no critical angle), but is incident into the protective film. Incident light is not re-reflected on the protective film-air layer interface due to an optical contrast structure composed of an air layer (low refractive index layer)/protective film/air layer, but is released to the exterior, whereby it is possible to minimize degradation of sharpness.

Now, the case of FIG. 3(b) will be described.

In this figure, since the protective film and the scintillator layer are in a close contact state, regarding lights X-Z emitted from the surface of the phosphor, light Z, exceeding critical angle θ, results in a ratio increase of light totally reflected from the surface of the phosphor due to an optical non-contrast structure composed of the protective layer-air layer. Consequently, the above becomes one cause to degrade sharpness.

In the present invention, when a scintillator plate is sealed employing the first protective layer and the second protective layer, it becomes possible to produce a scintillator panel which results in no degradation of sharpness by realizing a state, as shown in FIG. 3(a), in which the scintillator layer is substantially not adhered to the first protective layer, and the protective layer is also substantially not adhered to the surface of the flat light receiving element.

Further, it was discovered that by employing, as a substrate, a polymer film of a thickness of 50-500 μm and also regulating the total thickness of a scintillator panel to at most 1 mm, the scintillator panel was modified to a shape which matched that of the flat light receiving element, whereby uniform sharpness was realized over the entire light receiving surface of the flat-panel detector. Thus, the present invention was achieved.

In the present invention, as shown in FIGS. 1(a)-1(c), when the scintillator plate is sealed employing the first protective film and the second protective film, the following effects are realized in such a state that the first protective film which covers the scintillator layer is in a no substantial adhesion state (contacting points are arranged between the scintillator layer and the first protective film and voids (air layers) are provided between the contacting points).

1) It becomes easy to employ polypropylene film, polyethylene terephthalate film, and polyethylene naphthalate film, which have heretofore been difficult in use due to their high refractive index, which tends to degrade sharpness, though exhibiting excellent physical properties. Consequently, it has become possible to produce a high quality scintillator panel with minimal degradation of performance over a long-period.

2) Since it becomes possible to employ a highly abrasion-resistant protective film without degradation of image quality, it has become possible to realize a scintillator panel which exhibits excellent durability over a long-period.

3) It has become possible to realize a protective film which exhibits excellent durability without hindering the light guiding effect of phosphor crystals.

Figure 4:
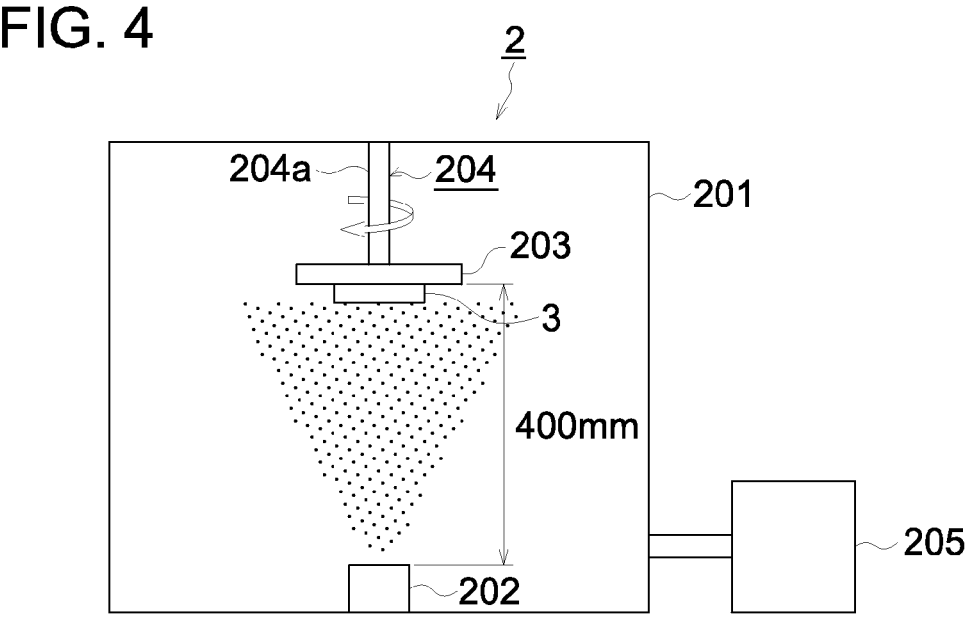
FIG. 4 is a schematic view of a deposition apparatus which forms a scintillator layer on a substrate via a gas phase deposition method.

FIG. 4 is a schematic view of a vapor deposition apparatus which forms a scintillator layer on a substrate via a gas phase deposition method.

In FIG. 4, 2 represents a vapor deposition apparatus. Vapor deposition apparatus 2 incorporates vacuum vessel 201, vaporization source 202, which is arranged in vacuum vessel 201 and deposits vapor onto substrate 3, substrate holder 203, which holds substrate 3, substrate rotation mechanism 204 which rotates substrate holder 203 with respect to vaporization source 202 so that the vapor from vaporization source 202 is deposited, and vacuum pump 205 which discharges gas from vacuum vessel 201 and introduces air.

Vaporization source 202 may be composed of an alumina crucible containing a coiled heater so that it accommodates scintillator forming materials and is heated by a resistance heating method, or may be composed of a heater prepared by employing metals of a high melting point. Other than the resistance heating method, employed as a method to heat the scintillator forming materials may be heating methods employing electron beams or high frequency induction. However, in the present invention, in view of ease of handling under relatively simple configuration, lower cost, and application compatibility to a number of substances, the resistance heating method is preferred. Further, vaporization source 202 may be a molecular beam source employing a molecular source epitaxial method.

Substrate rotation mechanism 204 is composed, for example, of rotation shaft 204a which rotates substrate holder 204, and a motor (not shown) which is arranged in the outside of vacuum vessel 201 and functions as a driving source of rotation shaft 204a.

Further, it is preferable that substrate holder 203 is provided with a heater (not shown) which heats substrate 3. By heating substrate 3, it is possible to release and remove substances adsorbed on the surface of substrate 3, minimize the generation of an impure layer between the surface of substrate 3 and the scintillator layer forming materials, enhance close contact, and regulate the quality of the scintillator layer.

Further, a shutter (not shown) to block the space from evaporation source 202 to substrate may be provided between substrate 3 and evaporation source 202. By providing the above shutter, substances other than targeted ones, which are adhered to the surface of scintillator layer forming materials, are evaporated in the early stage of deposition, whereby it is possible to minimize their adhesion to substrate 3.

In order to form a scintillator layer on substrate 3 employing the vapor deposition apparatus structured as above, initially substrate 3 is attached to substrate holder 203. Subsequently, vacuum vessel 201 is evacuated. Thereafter, substrate holder 203 is rotated with respect to evaporation source 202, employing substrate rotation mechanism 204. When vacuum vessel 201 reaches the degree of vacuum which enables vapor deposition, scintillator layer forming materials are vaporized from heated evaporation source 202, and phosphors are grown on the surface of substrate 3 to the targeted thickness. In this case, substrate 3 and evaporation source 202 are preferably arranged to form a gap of 100-1,500 mm. Scintillator layer forming materials, employed as an evaporation source, may be processed into a tablet shape via pressurized compression, or instead of scintillator layer forming materials, raw materials or a mixture of raw materials may be employed.

(Flat-Panel Radiation Detector)

The flat-panel radiation detector according to the present invention enables conversion of images to digital data in such a manner that the surface of the flat light receiving element converts light, emitted from a scintillator panel, to electric charges.

In a direct vapor deposition type (an integrated type), vapor deposition is directly conducted onto the surface of the flat light receiving element, and the flat light receiving element and the scintillator layer form an integrated scintillator. On the other hand, in the indirect vapor deposition type (the independent type) of the present invention, the structure is that the scintillator panel is placed on the surface of the flat light receiving element. In this case, it is characterized that the scintillator panel is not physicochemically adhered onto the surface of the flat light receiving element.

EXAMPLES

The present invention will now be described with reference to examples; however the present invention is not limited thereto.

Example 1

(Preparation of Scintillator Plate)

(Preparation of Substrate)

A 125 mm thick polyimide film (90 mm×90 mm) was provided as a substrate (Formation of Reflective Layer)

With regard to a polyimide (PI) film substrate, aluminum was arranged on one side at a thickness of 2,000 Å (0.2 µm) via sputtering.

(Formation of Sublayer)

Resin Sublayer:

| | |
|---|---|
| Vylon 630 (polymer polyester resin, produced by Toyobo Co., Ltd.) | 100 parts by weight |
| Methyl ethyl ketone | 100 parts by weight |
| Toluene | 100 parts by weight |

The above compounds were blended and dispersed via a bead mill over 15 hours, whereby a liquid sublayer coating composition was prepared. After applying the resulting liquid coating composition onto the surface of the above substrate to a thickness of 1.0 µm, employing a bar coater, the resulting coating was dried at 100° C. over 8 hours, whereby a sublayer was prepared.

(Formation of Scintillator Layer)

A scintillator layer was formed via vapor deposition of phosphor (CsI: 0.003Tl) onto a provided substrate, employing the vapor deposition apparatus shown in FIG. 4, whereby a scintillator plate was prepared.

Phosphor as a raw material (CsI: 0.003Tl) was placed in a resistance heating crucible. A substrate was arranged in a support holder, and the distance between the resistance heating crucible and the substrate was regulated to 400 mm. Subsequently, the interior of a vapor deposition apparatus was once evacuated, and after regulating the degree of vacuum to 0.5 Pa via introduction of Ar gas, the substrate was maintained at 140° C. while rotated at a rate of 10 rpm. Subsequently, the phosphor was deposited by heating the resistance heating crucible, and when the thickness of the deposited scintillator layer became 600 µm, vapor deposition was terminated, whereby the targeted scintillator plate was prepared.

(Annealing of Scintillator Plate)

A scintillator plate was annealed at 250° C. for 3 hours in an inert oven filled with nitrogen gas.

Subsequently, corners of the annealed scintillator plate were processed as shown in FIG. 5, and three types of scintillator plates were prepared.

(Preparation of Protective Films)

The first protective film and the second protective film were prepared as shown in Table 1.

(Production of Scintillator Panel)

The prepared scintillator plate was sealed to result in the configuration shown in FIG. 1(c), employing the prepared protective films as shown in Table 2, whereby the targeted scintillator panel was produced Samples Nos. 1-4 were prepared without adhesion of the first protective film with the scintillator layer. While Samples Nos. 5 and 6 were prepared in such a manner that the first protective film was fully adhered to the surface of the scintillator layer by using a polyol-isocyanate based (namely urethane based) adhesive. The layer structure of Samples Nos. 5 and 6 was: First Protective layer/Adhesive layer/Scintillator Layer. The thickness of the adhesive layer of Sample Nos. 5 and 6 was 3 µm.

Further, sealing was conducted in such a manner that under a reduced pressure of 1,000 Pa, fusion was carried out to result in a distance of 1 mm between the fused portion and the periphery of the scintillator sheet. The heater of an impulse sealer employed for fusion was 3 mm wide.

<<Evaluation Methods>>

(Determination of Luminance of Emitted Light)

A radiation image conversion panel was mounted on a 10 cm×10 cm CMOS flat-panel (X-ray CMOS camera system SHADOW-O-BOX 4 KEV, produced by Rad-icon Co.,) and X-rays at a tube voltage of 80 kVp was exposed to the rear side (the side on which a scintillator phosphor layer was not formed), and the determined count-value was regarded as emitted light luminance (sensitivity). Emitted light luminance was represented by a relative value when the emitted light luminance was 1.0.

(Moisture Resistance Test)

A humidifying cycle thermo of 20° C. 5.5 hours→temperature elevation 0.5 hour→30° C. 80% RH 5 hours→temperature decrease 1 hour→20° C. was conducted for 7 days, and degradation of sharpness of the sample was determined (the method to evaluate sharpness is described below).

Degradation ratio of sharpness={1−(sharpness after test/initial sharpness)}×100%

Degradation of sharpness was evaluated as follows:

A 0-5%

B 5-20%

C 21-30%

D at least 31%

(Specific Problem Generation Ratio During Moisture Resistance Test)

The above moisture resistance test was conducted for 1,000 samples, and a specific problem generation ratio was calculated as follows.

"Specific problem generation", as described herein, refers to an evaluation sample, which was lower by two ranks from the average value when evaluated at four ranks A, B, C, and D.

Further, the generated ratio of specific problem generated sample is represented by a specific problem generated ratio (Formula 1).

Specific problem generated ratio=(number of specific problem generated sample sheets/1,000 evaluated samples)×100%  (Formula 1)

Based on the above specific trouble generated ratio, the following evaluation was made.

A 0%

B 0-5%

C 5-20%

D at least 20%

(Evaluation of Sharpness)

Each sample was mounted on 10 cm long×10 cm wide CMOS flat-panel (X-ray CMOS camera system SHAD-O-BOX 4 KEV, produced by Rad-ikon Co.), and MTF of each sample was determined and calculated based on 12 bit output data.

In practice, X-rays at a tube voltage 80 kVp were exposed onto the rear side (the side on which no phosphor layer was formed) of each sample through a lead MTF chart, and image data were detected by the CMOS flat-panel and recorded onto a hard disk. Thereafter, recoding on the hard disk was analyzed via a computer, and the modulation transfer function (MTF) of the X-ray image recorded on the aforesaid hard disk was calculated. The resulting calculation results (MTF values in % of a spatial frequency of 1 cycle/mm) was obtained. The higher the MTF value is, the better the sharpness becomes.

(Evaluation of Relative Sharpness)

The sharpness values of samples were measured in accordance with the measuring method described above. The evaluation was done for the relative value of each sample when MTF (%) value of Sample No. 1 is set to be 100%. The Relative Sharpness was evaluated as follows.

A: 95%≦(equal to or more than 95%)

B: 90%≦ <95% (not less than 90% and less than 95%)

C: 80%≦ <90% (not less than 80% and less than 90%)

D: <80% (less than 80%)

(Evaluation of Image Non-Uniformity and Linear Noise)

Each sample was mounted on 10 cm×10 cm CMOS flat-panel (X-ray CMOS camera system SHAD-O-BOX 4 KEV, produced by Rad-ikon Co.), and X-rays at a tube voltage of 80 kVp were exposed onto the rear side (the side on which no scintillator phosphor layer was formed), whereby a solid image was captured. The resulting printed image was visually observed, and generation of image non-uniformity and linear noise was evaluated. The image non-uniformity and linear noise were evaluated as follows.

A: neither image non-uniformity nor linear noise was noted

B: slight image non-uniformity and linear noise were noted at 1 or 2 positions on the surface C: slight image non-uniformity and liner noise were noted at 2-4 positions of the surface D: image non-uniformity and linear noise were noted at least 4 positions and dark areas were noted at fewer then 5 positions The above evaluation results are summarized in Table 2.

TABLE 1

| | Prepared Protective Film | |
|---|---|---|
| | | Structure |
| No. | No. | Structure and Component |
| A | Structure (A) | PET(12 μm)//CPP(30 μm) |
| B | Structure (B) | alumina 30 nm deposited PET(12 μm)//CPP(30 μm) |
| | | . . . alumina deposited side//side |
| C | Structure (C) | alumina 30 nm deposited PET(12 μm)//PET(12 μm)//CPP(30 μm) |
| | | . . . alumina deposited side//side |
| D | Structure (D) | PET(100 μm)//aluminum foil(7 μm)//CPP(40 μm) |

* in this table, "//" refers to the adhesion layer of a dry laminate

The above adhesion layer was composed of a polyol-isocyanate based) adhesive and was laminated via a dry-laminate method.

TABLE 2

| | Scintillator Panel | | | Evaluation Result | | | | | |
|---|---|---|---|---|---|---|---|---|---|
| No. | First Protective Film | Second Protective Film | Layer Composition | Luminance of Emitted Light | Moisture Resistance Test | Specific Problem Generation Ratio | Image Non-uniformity and Liner Noise | Relative Sharpness | Remarks |
| 1 | Structure (B) | Structure (D) | *1 | 1.0 | A | B | A | A | Inv. |
| 2 | Structure (C) | Structure (D) | *1 | 1.0 | A | A | A | A | Inv. |
| 3 | Structure (A) | Structure (A) | *1 | 1.0 | D | D | D | A | Comp. |
| 4 | Structure (B) | Structure (B) | *1 | 1.0 | B | D | C | A | Comp. |
| 5 | Structure (B) | Structure (D) | *2 | 1.0 | A | B | B | D | Comp. |
| 6 | Structure (C) | Structure (D) | *2 | 1.0 | A | A | B | D | Comp. |

*1: First Protective Film and Scintillator Layer were substantially not adhered.
*2: First Protective Film and Scintillator Layer were fully adhered.

As can clearly be seen from the results shown in Table 2, in the examples according to the present invention, the degradation ratio of sharpness and the specific problem generation ratio were reduced and the image non-uniformity and linear noise were markedly reduced. The results obtained from samples Nos. 5 and 6 show that the evaluation results of Relative Sharpness were much inferior when the first protective layer is adhered to the surface of the scintillator layer.

What is claimed is:

1. A flat-panel radiation detector comprising:
   a scintillator panel; and
   a flat light receiving element,
   wherein the scintillator panel comprises a scintillator plate comprising a substrate having thereon a reflective layer, a sublayer, and a scintillator layer in that order;
   the scintillator plate is sealed with:
      a first protective film provided on a side of the scintillator layer; and
      a second protective film provided on a side of the substrate opposite the scintillator layer;
      wherein the first protective layer is not adhered to the scintillator layer, and the second protective layer contains an aluminum layer; and
   the scintillator panel is arranged facing the flat light receiving element without physicochemical adhesion to a surface of the flat light receiving element.

2. The flat-panel radiation detector of claim 1, wherein the scintillator layer is a columnar phosphor layer comprising cesium iodide, and the scintillator layer is produced by a gas phase deposition method.

3. The flat-panel radiation detector of claim 1, wherein the substrate is made of a heat resisting resin.

* * * * *